May 15, 1956

B. F. HOLMES ET AL 2,746,001

ELECTRIC MOTOR OPERATION WITH INTERLOCKING
RELAYS AND CONTROL CIRCUITS

Original Filed Dec. 10, 1947

6 Sheets-Sheet 1

Fig. 1

INVENTORS
Burton F. Holmes &
Herbert H. Heindel

Edmund B. Whitcomb
Attorney

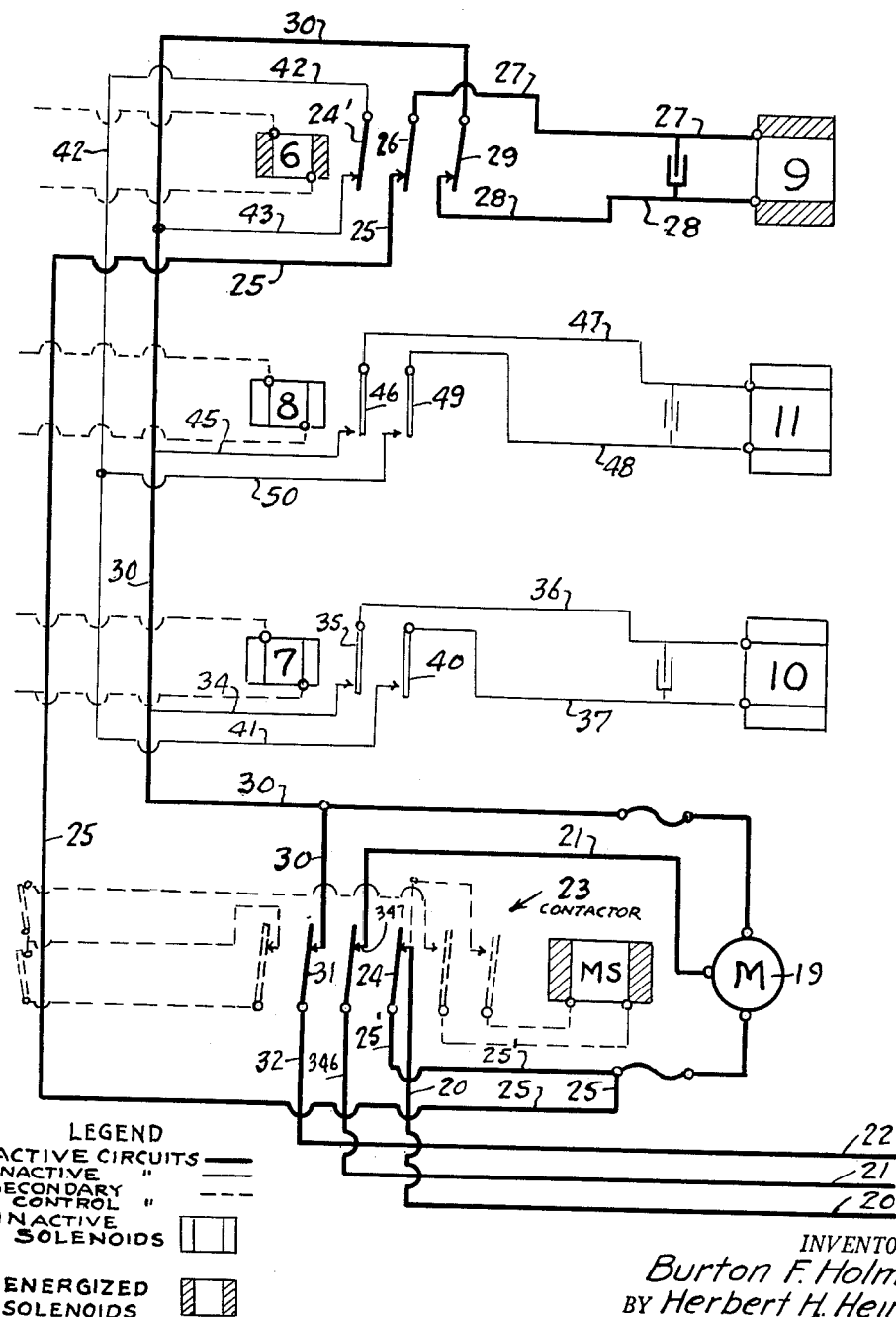

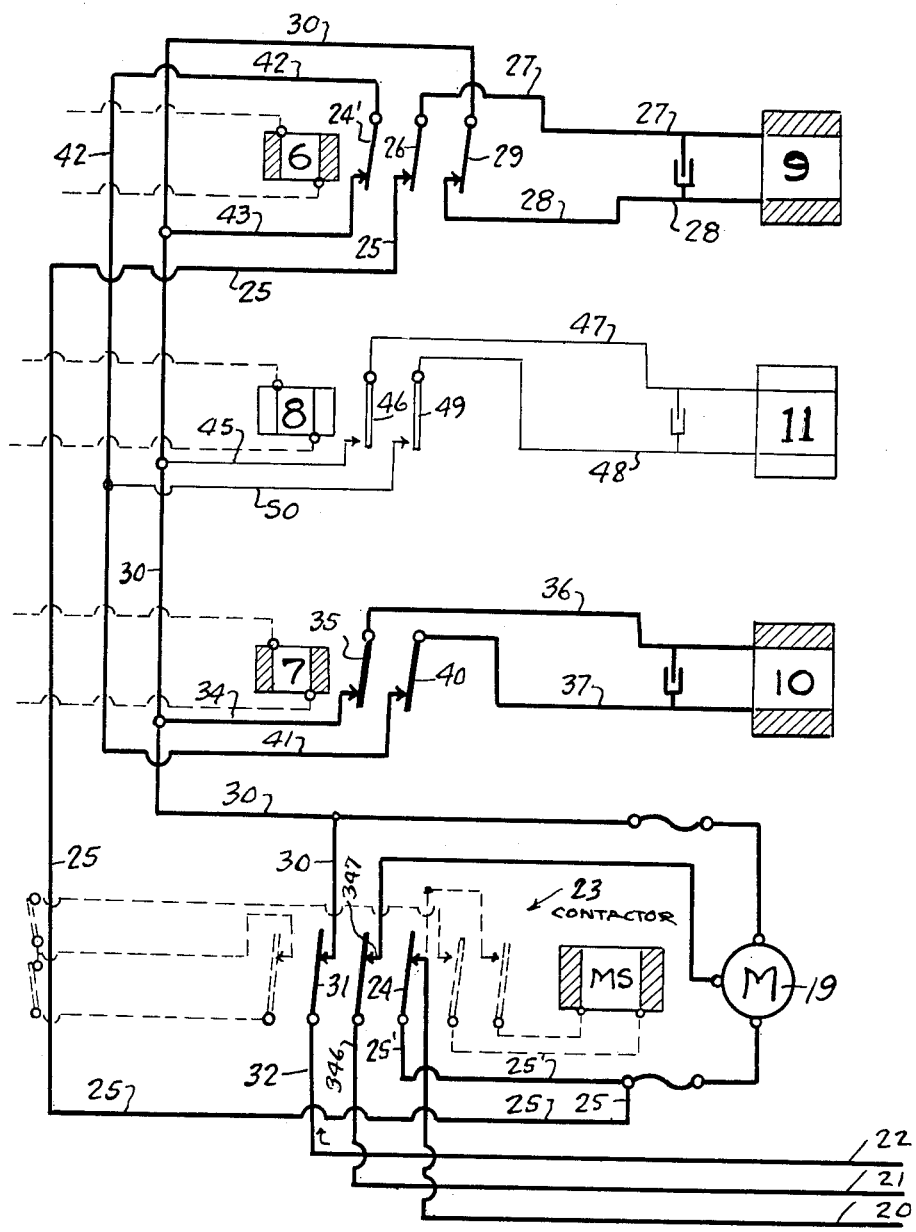

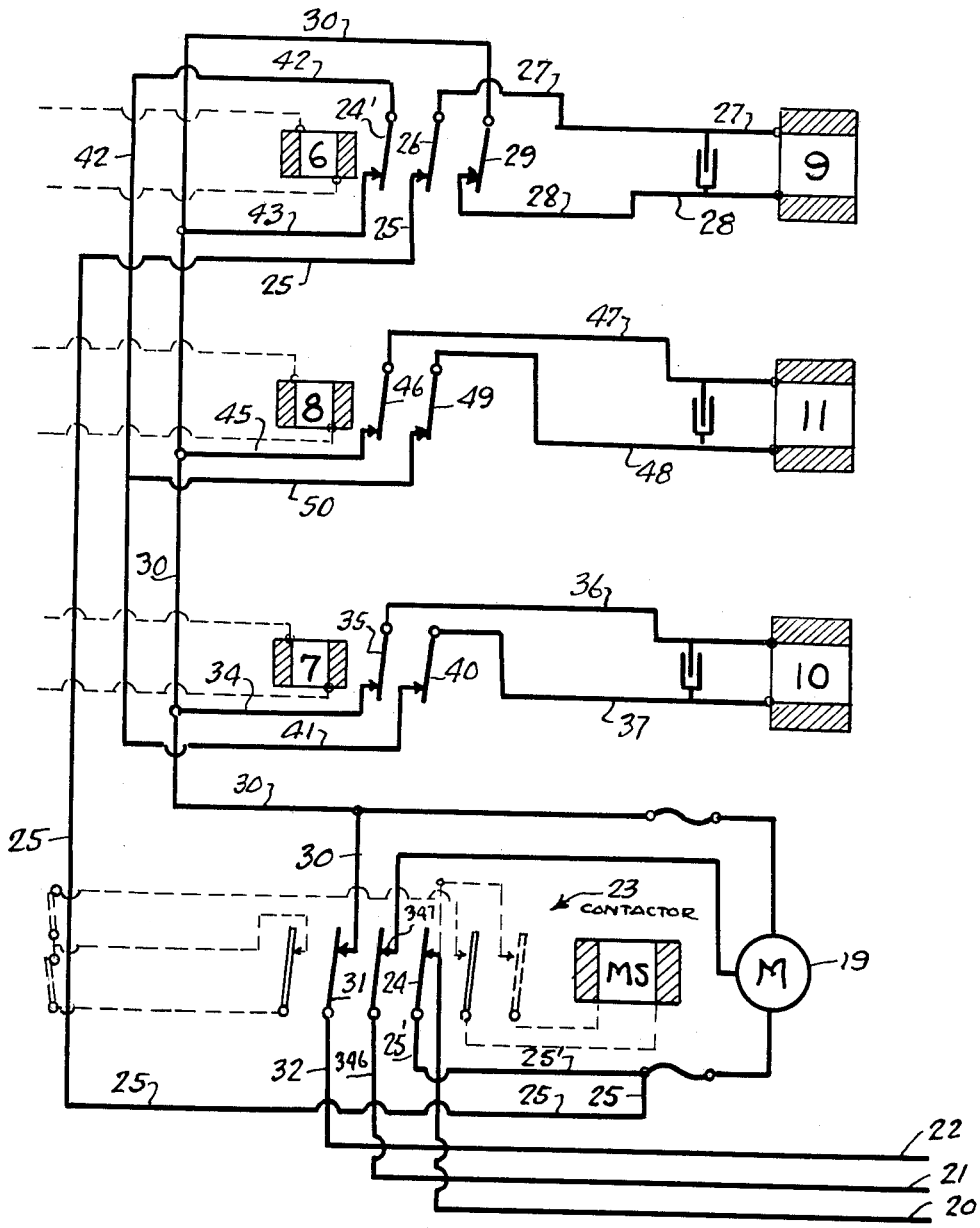

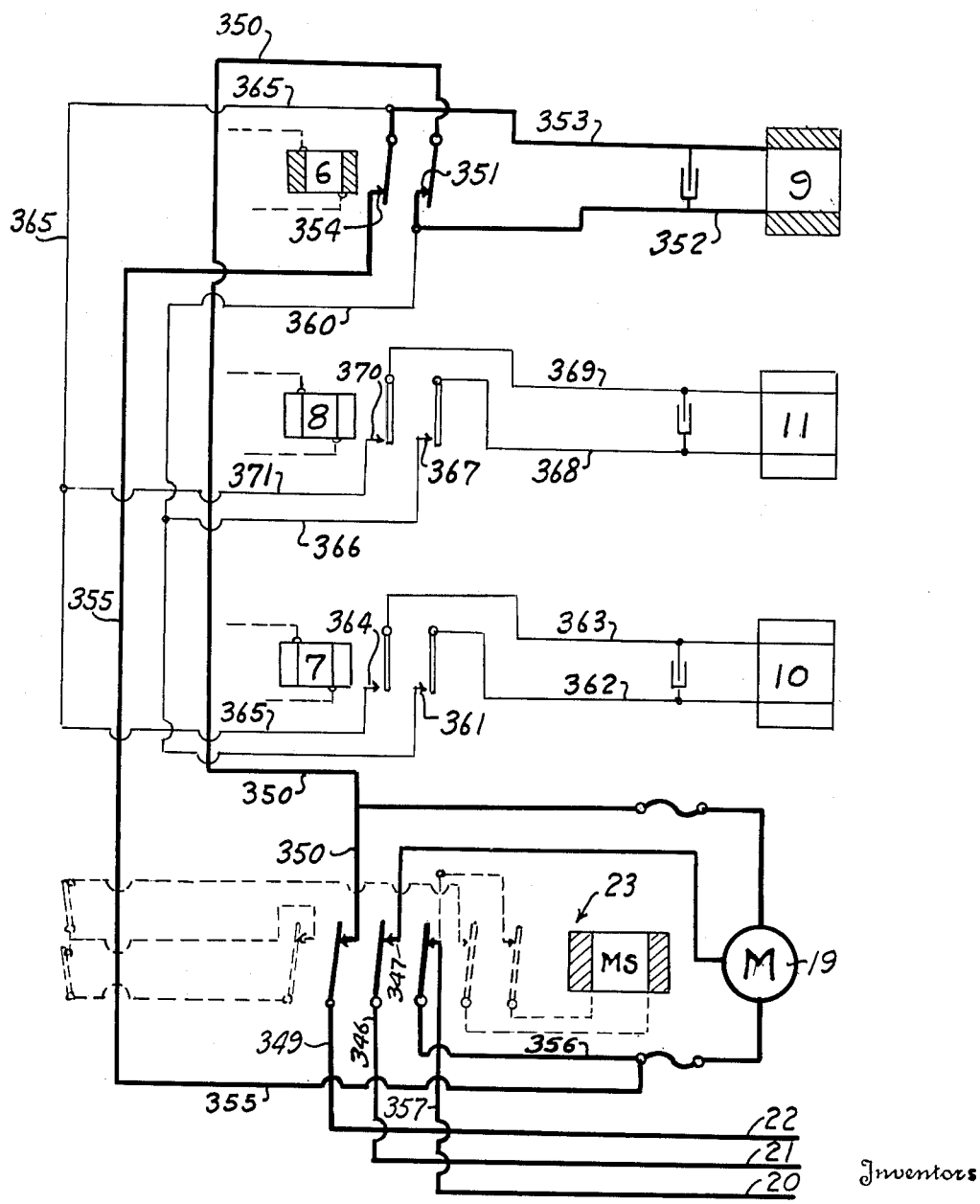

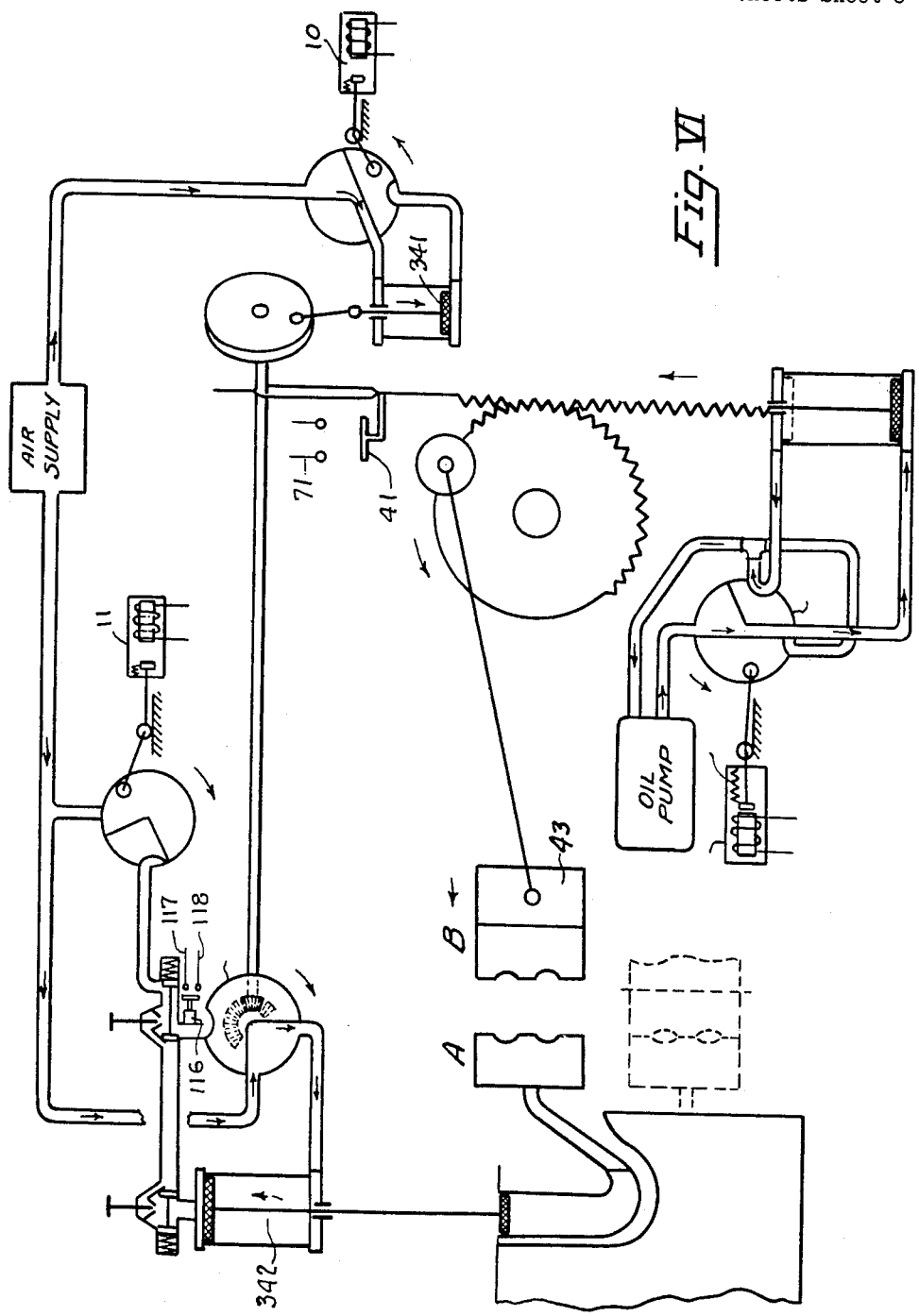

United States Patent Office 2,746,001
Patented May 15, 1956

2,746,001

ELECTRIC MOTOR OPERATION WITH INTER-
LOCKING RELAYS AND CONTROL CIR-
CUITS

Burton F. Holmes and Herbert H. Heindel, Toledo, Ohio, assignors to Schultz Die Casting Company, Toledo, Ohio, a corporation of Ohio Application November 21, 1950, Serial No. 196,914, now Patent No. 2,700,737, dated January 25, 1955, which is a division of application Serial No. 790,838, December 10, 1947, now Patent No. 2,532,256, dated November 28, 1950. Divided and this application February 9, 1953, Serial No. 335,876

9 Claims. (Cl. 318—484)

This application is a division of our prior application, Serial No. 196,914, filed November 21, 1950 now Patent 2,700,737, issued January 25, 1955, which, in turn, is a division of our first filed application, Serial No. 790,838, filed December 10, 1947, now Patent No. 2,532,256, issued November 28, 1950.

The invention of our present division relates to an electrical system of interconnected load circuits including manual and automatic switches, relays, solenoids and interlocked controls with operating means for correlating the action of an electric motor with electrical means for controlling in sequence the operation of other separate loads or electrically operated parts in interlocked relation particularly associated with said motor and adapted, for example, for use in a die casting machine, press or similar type of machine or electrically operated mechanism.

More specifically, our present invention relates to an electrical interconnection between the control of an electric motor for producing an hydraulic pressure for operating parts of a machine, and controls interlocked therewith for the electrical operation and control of the action of other mechanical parts of the same machine, all said electrical means receiving energy from an input power line.

The underlying feature of the present case resides in the safety features provided by our interlocked electrical circuit control and operating arrangement to insure, for example, closing of the dies before metal injection can take place when our electrical controls are used for this type of machine.

Further objects and advantages are within the scope of this invention, such as relate to the arrangement, operation and function of the related elements of the structure, to various details of construction and to combinations of parts, elements per se, and to economies of manufacture and numerous other features, as will be apparent from a consideration of the specification and drawing of a form of the invention, which may be preferred, in which:

Figure I is a diagram of our invention;

Figure II is an electrical diagram showing (by heavy lines) particularly the interconnection between the input circuit, motor and one coil with correlated solenoid and circuits;

Figure III is a diagram similar to Figure II, but showing the interconnections with another controlling coil and its operating solenoid;

Figure IV is a similar view showing interconnections with a third coil and its operating solenoid;

Figure V is a modification of Figure II, and

Figure VI is a diagrammatic view showing one adaptation of the present invention in a die casting machine.

Referring to the circuit diagrams of the drawings, Figures I and VI are identical in disclosure to the corresponding figures of our prior Patent No. 2,532,256, while Figures II, III, IV and V (although the latter is a modification) are merely separated diagrams of the original electrical circuits particularly illustrating the interconnection between the electrical motor circuits and the solenoid operating circuits, Figure V showing certain loads in parallel instead of in series with other loads. These Figures II, III, IV and V forming the basis of the claims of this present case are based (except as to the details of the change from series to parallel in Figure V) upon the entire electrical system diagram of Figure I in which the space discharge tubes 1, 2, 3, 4, are connected to automatically control by a timing network hereinafter described the sequential operation of certain controlling coils 6, 7 and 8 which, in turn, effect operation of the loads in the form of solenoids 9, 10 and 11 for effecting actuation of machine parts such as the mechanisms of a die casting machine.

Since the particular feature of the present invention is the interconnection between the control of the motor 19 and the several operating solenoids and controls, as more specifically brought out in Figure II, et seq., we will now refer to that figure where the electric power input is shown as a three phase 440 volt alternating current supply in lines 20, 21 and 22. These leads are connected through a "contactor" 23 to electric motor 19 which in turn actuates the oil pump (see Figure VI) for producing oil pressure to operate, for example, a die closing means. This motor 19 for producing said oil pressure is one of the "loads" and others include the operating solenoids 9, 10 and 11 which have controlling circuits and controlling coils 6, 7 and 8. Interconnected therein for timing and actuating the controls is the sequential timing mechanism of which the thyratron tubes 1, 2, 3, 4 referred to, supra, are the main controlling agents. As will appear hereinafter more fully, the motor 19 by driving the oil pump (referred to supra) furnishes the oil pressure for effecting closing of the dies and thus operates the two position switch (170 and 294) to establish the energization of the controlling network which in turn causes action of relays 6, 7 and 8 for loads 9, 10 and 11 respectively.

Each of the main power input lines 20, 21 and 22 connect to switch blades on the contactor 23. This contactor 23 directly controls the current both to the motor 19 and to the above-mentioned actuating solenoids 9, 10 and 11, but not to controlling coils 6, 7 and 8, which are on a lower voltage, a 24 volt control circuit and controlled by the rest of the system as stated.

For coil 9, the following is the circuit (see Figure II): Input 20 to contactor 23 through a switch blade 24 third from the right down to lead 25', lead 25 up to the middle blade 26 of coil 6 over line 27 through coil 9, back on lead 28 through the outside switch point blade 29 through lead 30 to contcator 23, specifically to switch blade 31; hence, to lead 32 and main power line 22.

The circuit for coil 10 is as follows (see Figure III): Input 20 to contactor 23 through a switch blade 24 third from the right down to lead 25', lead 25 up to the middle blade 26 of coil 6 over line 27 through coil 9, back on lead 28 to right-hand switch point 29 of coil 6; hence, to the lead 30, as far as the junction of leads 30 and 43, hence by lead 43 and point 24' (closed), lead 42, lead 41, switch 40 (now closed as relay 7 has operated) lead 37 coil 10, lead 36 switch 35 lead 34 to the junction thereof with lead 30 to contactor 23 and power line 22.

The circuit for coil 11 is as follows (see Figure IV): Input 20 to contactor 23 through a switch blade 24 third from the right down to lead 25', lead 25 up to the middle blade 26 of coil 6 over line 27 through coil 9, back on lead 28 to right-hand switch blade 29 of coil 6; hence, to the lead 30 and to the junction thereof with lead 43, lead 43, switch 24' (closed) lead 42, junction thereof with lead 50, lead 50, blade 49, lead 48 coil 11 and back on lead 47, switch 46, lead 45 to the junction thereof with lead 30, and hence through lead 30 to contactor 23 to power line 22.

In Figure V, we illustrate a modification of the circuits for controlling the action of the three main machine part actuating coils 9, 10 and 11. In this modification shown in Figure V, which we regard as the preferred embodiment, the motor 19 is connected with the 440 volt input leads 20, 21 and 22 by the lead 346 to a point 347 on the contactor switch 23, hence, to the middle lead on the motor 19. The other two leads of the motor 19 are connected by leads, as shown, through other switch points on said contactor 23 to the input leads 20 and 22.

The circuit for energizing the first coil 9 which circuit includes the points of the first of three controlling relays, namely, relay 6, includes lead 349 from input lead 22 to a point (second from the left) on switch 23 and therefrom through lead 350 to point 351 on relay 6, lead 352, actuating coil 9, lead 353, point 354 on relay 6, hence, by lead 355 to lead 356 adjacent contactor 23 to a point on said contactor and, hence, by lead 357 to the other power lead 20.

The circuit for energizing the second actuating coil 10 in Figure V includes a circuit parallel to the one just described and extends from the point 351 of said controlling relay 6 by lead 360 to a point 361 of another controlling relay 7, hence, by lead 362 through coil 10 and then by lead 363 to another point 364 on said relay 7. Then, by lead 365, this parallel circuit connects to lead 353 adjacent switch point 354 of relay 6. It will thus be seen that this parallel circuit for the second coil 10 being connected as just described from lead 360 to lead 365 which as described above in connection with the energizing circuit for the first coil 9, has a 440 volt connection through contactor 23 with the main input lines 22 and 20. It will be noted that this second circuit for energizing with 440 volts the second actuating coil 10 of the series of these coils 9, 10 and 11 does not go through coil 9.

The third circuit for energizing the third coil 11, which circuit is also parallel to the first and second circuits just described is shown in Figure V, has a connection from lead 360 by a lead 366 to a point 367 of a third controlling relay 8, hence by lead 368 through the third actuating coil 11 and then by lead 369 to another point 370 of said relay 8 and by lead 371 from said point to lead 365. It will be seen that this energizing circuit for the third actuating coil 11 is therefore connected to the main power lines 22 and 20 since the circuit just described for energizing coil 11 connects between leads 365 and 360 which are in turn both connected through main contactor switch 23 to said power lines when contactor 23 is in position to properly energize the first coil 9. However, in the case of each of coils 9, 10 and 11 the actual energization thereof is controlled by controlling relays 6, 7 and 9 in the timed sequence above indicated for the other Figures II, III and IV, the entire controlling system being shown in Figure 1.

Referring now to the entire system illustrated in Figure I, we show the main power input leads 20 and 21, as first provided fuses 153 and 154 and leads 155 and 156 to the switch points of another contactor having coil 157 having transformer 158 and outlet points 159 and 160. This energizes transformer 158 and a secondary voltage (24 volts) from transformer 158 is applied to coil 157 through switch 161 by leads 160 and 162. Thus, this manual switch 169 establishes the main power inlet connection to the "control" system to be described while "contactor" switch 23 supplies voltage from the power line for operating the main solenoids 9, 10 and 11 for the actual operation of the machine. Then, by leads 163 and 164, voltage is applied to a main tapped transformer 165 which has a 440 volt primary and a 220 voltage secondary tapped at 110 volts to give another or third reduced circuit voltage of 110 volts. A circuit ground lead 166 is grounded at 167.

We provide a 220 volt circuit from transformer 165 (said circuit to be hereinafter further described), for the purpose of supplying current to the plates of thyratron tubes 1, 2, 3 and 4, and also through an additional transformer 168 to the 24 volt control circuit for actually connecting the operating circuit to the machine control valves.

In Figure I, the diagrammatic illustration shows through said reduced voltage circuit a connection illustrating the control circuit which includes the automatic return push button 169 which, being connected to the power, closes the circuit through the microswitch 170 and lead 171 to coil 172 to close its contacts so that the casting machine dies close, as in Figure V, relay 172 being the key relay for controlling the die operations. Lead 173 extends from switch 174, lead 173 to relay 175 having normally open switch point 176 on the power panel and connected with the input circuit as will be hereinafter pointed out. Then, a lead 177 extending from the other side of relay switch point 176 connects with relay 6 causing an operation of the pilot valve and hence the die actuating mechanism. The other side of this circuit from coil 6 is by lead 178, point 179 of relay 175, hence, by lead 180 and network leads to 24 volt control power switch relay 181 (the detailed circuits to be described).

The 24 volt circuit closed to relay 6 (during the operation of the machine) energizes coil 9 to close the die operating mechanism, the circuit for coil 9 being a 440 volt circuit from the power line.

*Tubes fire in sequence, effecting casting machine operation*

Following the operation of said die closing circuit controlled by relay 172, the thyratron tubes 1, 2, 3 and 4 fire. Tubes 1 and 2 control the metal injection in two stages. Tube 3 temporarily rebiases tubes 1 and 2 and tube 4 resets the circuits to initial position, rebiasing all tubes. Thus, tube 1 fires, causing slow injection of molding metal; then tube 2 fires—releasing the main valve of check valve mechanism (see Figure VI) to permit a full shot of metal; tube 3 first holds the time delay after tubes 1 and 2 have fired, and then when tube 3 fires, it resets tubes 1 and 2 (releasing their valves); when tube 4 fires, it unlocks die closing mechanism, allowing dies to open—all as will hereinafter more fully appear.

*Power input circuit*

The three phase inlet leads 20, 21 and 22 are for a standard type of three phase motor 19, the motor which produces the oil pressure for the die operating mechanism and includes a branch lead 183 (from input lead 20) to a standard type of contactor shown indicated at 23. Another lead connects 21 with contactor 23. A standard type of push station mechanism 340 is used to energize contactor 23, thereby applying power to motor 19 and also supplying 440 A. C. volts to coils 9, 10 and 11, the controlling relays 6, 7 and 8 being on a 24 volt circuit.

A safety feature is here provided, in that if contactor 23 for any reason opens, it removes the power from the main injection operating air valves 10 and 11 and oil valve 9, thus preventing squirting metal into the room. To do this, we provide power leads 25 and 30 in these coil circuits, lead 30 passing through the points of contactor 23 as shown. Thus, if contactor 23 is opened, then no voltage will be applied to coils 9, 10 and 11 because the operating circuits to said coils will be opened. Hence, we provide interconnected means between the original source of power for operating the hydraulic die closing means and the particular metal injecting means illustrated.

*Tube supply circuits, transformer connections, etc.*

We also provide a 110 volt circuit from a main transformer 165 (said circuits to be hereinafter further described), to supply another transformer 184 for lighting the filaments of tubes 1, 2, 3 and 4 at 6.3 volts and another circuit for a heating element. We also include a 5 volt heating element for a rectifier tube 185 and a high voltage for the plates of the same. This rectifier tube 185 supplies D. C. current to the grid bias circuits for the main thyratron tubes 1, 2, 3 and 4.

The 110 volt circuit from main transformer 165 includes fuse 186, lead 187 to normally open point 188, lead 189 to connecting point 190, which supplies, through lead 191, the 110 volt primary of transformer 184. The 110 volt circuit from main transformer 165 also has lead 192 connected to lead 187 from said transformer, said lead 192 extending to terminal 193 to supply 110 volts for gas supply and heat control.

Referring now to the above mentioned 220 volt circuit from transformer 165, the same includes fuse 194, lead 195 to primary of transformer 168. The other side of the primary of said transformer 168 is grounded at 167 from lead 196.

This transformer 168 has a 24 volt secondary winding with lead 197 which, by lead 198, passes through a coil 175, the other side of coil 175 having lead 199 connected to switch 200 (normally open). The return circuit includes lead 201, and lead 202 to the other side of the 24 volt transformer 168. Thus, when switch 200 in this circuit is closed, coil 175 is energized and this closes switches to effect an application of voltage to the system for automatic operation of the machine. Therefore, switch 200 is a key switch by means of which the mechanism may be disconnected from all automatic operation and, in certain instances, the machine may be operated manually.

This 24 volt control circuit also connects through lead 197, and a short lead (not numbered) to both points 204 and 205 of relay 181.

Relay 181 is located in an arrangement of circuits provided to give a delaying action to the application of the 220 volts to the plates of the main network thyratron tubes 1, 2, 3 and 4 to allow said tubes to warm up. This 220 volt plate circuit is also controlled by the main bias for said tubes through coil 206 as hereinafter set forth, but the delayed warm up control action is accomplished by a mercury time delay mechanism 206, 207 and the connections are controlled by relay 181. Thus, this 24 volt circuit is connected from transformer 168 by lead 197 to lead 208 through point 207 of the combined choke coil and relay 206 and back by lead 209 to the coil of relay 181. The coil 181 is connected on the other side by lead 202 to transformer 168.

Each of the plate circuits for the tubes are connected to ground terminal 167 from the main transformer 165, since each cathode circuit is grounded as shown. On the other side from said transformer 165, the plate circuits include the fuse 194, lead 210 to normally open point 211 on relay 175, which point is closed in the automatic position of the apparatus. From point 211 we provide lead 502 to normally open point 213 on relay 181, which point is also closed in the automatic machine position but only after the time delay for the tube warm up has taken place—in view of switch 207, supra. Lead 214 from point 213 connects with lead 215 through lead 216 and all the tube place circuits connect to wire 215. Thus, for the plate circuit of tube 1, we have a lead 217 connected from lead 215 at its junction with lead 216, lead 217 then extending to resistor 218 to limit the current flow, lead 219 to coil 220 and lead 221 to the plate of tube 1. The cathode circuit of tube 1 is grounded as indicated by a circuit 222 and, hence, completes the circuit to the main transformer 165, since the latter is grounded at 167, as stated supra. We also have a condenser 223 connected across coil 220 to supply current to the relay coil 220 on the negative one-half cycle and prevent chattering of the points controlled by relay 220.

The other tubes 2, 3 and 4 are similarly connected.

Thus, for tube 2, lead 224 is connected to the lead 216 common to all of tubes 1, 2, 3 and 4, as indicated supra. Lead 224 connects through resistor 225, lead 226, to coil 227, hence, by a lead 228 to the plate of tube 2 as shown. A condenser 224 is connected across leads 226 and 228 for coil 227, as shown.

For connecting tube 3, we provide a lead 229 passing through the resistor 230 to lead 231, which connects with coil 232 having lead 233 connected to the plate of tube 3. A condenser 234 is connected across leads 231 and 233. The cathode circuit of tube 3 is grounded as indicated by circuit 235.

For tube 4, we also provide a lead 236 connected with a common connecting lead 215, limiting resistor 237, lead 238, coil 239, lead 112, to the plate of tube 4. We also provide a condenser 240 across leads 238 and 112 as in the case of the other three tubes. The cathode of tube 4 is also grounded by circuit 241, as indicated.

*Bias circuits*

The bias supply for each of tubes 1, 2, 3 and 4 which is from a common source to each tube, will now be described.

110 volts from the main transformer 165 through relay 175 connects by lead 189 to point or terminal 190, which is connected by lead 191 to the primary of the transformer 184 and returns by 242 to ground as shown at 243.

The transformer 184 has three secondaries, one 244 for the 6.3 volts for the filaments of the tubes 1, 2, 3 and 4.

Another secondary output circuit of 5 volts is indicated 245 for the rectifier tube 185.

The third secondary from transformer 184 constitutes a source for supplying the bias for the several thyratron tubes 1, 2, 3 and 4. The current for the bias is changed from alternating current to direct current and, to this end, we provide rectifier tube 185 connected by leads 246 and 247 joined on the outside terminals of winding 248 of transformer 184 and to the plates of rectifier tube 185 as shown. The cathode of rectifier tube 185 is grounded as shown at 190. Parallel to the plate cathode circuit of rectifier tube 185 is a condenser circuit 249 having a filter condenser 250 located therein. We also provide in the grid circuit for the main thyratron tubes a voltage regulator tube 251 grounded as shown so that the direct current from the rectifier tube 185 is supplied to the plate of regulator tube 251 as indicated. The outlet terminal of regulator tube 251 is connected by lead 252 to lead 253 and also to lead 254 which is the main bias supply lead for the thyratron tubes 1, 2, 3 and 4. We also provide a bleeding resistor 255 in a circuit parallel to the regulating tube 251 as shown, connected with the bias supply lead 254.

The relay and controlling coil 206 is connected by a lead 252′ to the output lead 252 of the regulating tube 251, said coil 206 being also connected by lead 256 through resistor 257 to the center of winding 248 which places coil 206 in series with the grid circuit for the thyratron tubes 1 and 2.

Our connections for these tubes also forms a time delay for the warming up of tubes 1, 2, 3 and 4, since relay 206, when energized, closes points 207, there being a time delay on the make of said points 207 with a well-known type of switch which has a quick break.

Moreover, this relay 206 provides a safety arrangement, since failure of any part of the bias supply will cause 207 to open, dropping out relay 181 which disconnects the plate circuits of the tubes 1, 2, 3 and 4. This also drops out the 24 volt control circuit to the automatic operation.

*Connections for the bias supply voltage and tubes 1, 2, 3 and 4*

The above circuits and the tubes 185 and 251 provide means to produce the bias voltage for the main thyratron tubes 1, 2, 3 and 4. We will now describe its connection to these tubes. Thus, we have a main bias supply lead 254 joined to lead 253 as shown, which lead 254 connects with three points (normally closed) on relay 258, points 259, 260 and 261. Lead 254 is also connected with the points of relay 232, namely, points 262, 264, 266 and 268. This lead 254 also has a connection to lead 269 to a contact 270 of relay 220. Lead 254 is in the main bias supply line for all four tubes.

For tube 1, bias is normally supplied from lead 254 to point 259, lead 271, resistor 272, the lead 273, to the grid of tube 1.

For tube 2, the main bias is from point 269, lead 274, resistor 275, lead 276, to the grid of tube 2. This main bias lead 254 also has a connection for an auxiliary circuit for tube 2 by lead 269 to a contact 270 of relay 220 controlled by tube 1. For tube 3, the main bias includes lead 277 from point 261, to resistor 278, lead 279, to the grid of tube 3. Tube 3 also has an auxiliary bias circuit, since we provide a lead from bias line 254 to point 266 of the relay 232 as shown. We also provide a lead 267 from point 266 to point 280 of relay 227 of tube 2. Then we also provide a lead 281 connecting with lead 277 to the grid of tube 3. Hence, the auxiliary bias for tube 3 is so connected as to have in series therewith a switch controlled by the relay for tube 2.

For tube 4, the bias includes a lead 282 from point 268 to resistor 283, lead 284, to the grid of tube 4. As the necessary part of the operation, as will hereinafter appear more fully, we also provide additional temporary bias circuits for tubes 1 and 2. This additional bias for tubes 1 and 2 includes a circuit from switch point 262 of relay 232 by way of lead 263 which connects to lead 271 to the bias of tube 1. For tube 2, this additional temporary circuit is connected with relay point 264 by lead 265 which connects with lead 274 to the gride of tube 2.

Sequential firing of tubes

We have provided means for causing tubes 1, 2, 3 and 4 to "fire" in sequence one after the other, and, moreover, any subsequent tube in the series cannot "fire" until the preceding tube has fired. The circuits and means for accomplishing this will now be described. Thus, when relay coil 258 is energized, this opens points 259, 260 and 261, removing the main bias from tubes 1, 2 and 3. However, bias for tube 2 is now being supplied through an auxiliary circuit including a connecting lead 269 extending from lead 254 to switch point 270, lead 285, lead 274, resistor 275, lead 276 to grid of tube 2. When tube 1 fires (at the end of its time delay, to be described), relay 220, through lead 221, is then energized and normally closed point 270 now opens, removing the auxiliary bias from tube 2.

Also, the firing of tube 1 and energizing of coil 220, closes the normally open point 286 thereby applying 24 volts to the power relay 7 by leads 287 hence to supply power line voltage to valve solenoid 10 to operate metal injection at reduced pressure, as will be pointed out.

Firing of tube 2

At the expiration of the time delay for tube 2, tube 2 fires (the auxiliary bias being removed by firing of tube 1, as stated supra). The bias now on tube 3 is by reason of the auxiliary bias circuit described above. Firing of tube 2 opens normally closed point 280 of relay 227 which removes this auxiliary bias from tube 3.

The energizing of coil 227 also closes normally open point 288 which, through lead 289, energizes relay 8 for operating the check valve mechanism 11 to give the full shot of metal used in the die casting machine.

Firing of tube 3

Removing bias from tube 3 allows tube 3 to fire at end of its time delay energizing the coil of relay 232, closing normally open points 262 and 264, thereby reapplying the third or temporary additional bias to tubes 1 and 2, thus resetting these tubes and their associated plate circuit relays.

Firing of tube 4

Moreover, normally closed points 266 and 268 are opened and since 266 is opened, this prevents reapplying bias to tube 3 by tube 2 at this point of the cycle. The opening of 268 removes bias from tube 4.

When tube 4 fires at the end of its time delay, the relay 239 is energized, opening normally closed point 290 which breaks the holding circuit for the die operating mechanism above described. This holding circuit being removed, coil 9 is deenergized, and this permits the dies to open by a spring X thereby shifting oil valve 63a (see Fig. V) and reversing the movement of piston 60a causing the hydraulic (first) motor through the linkage and associated mechanism to cause return of the die B to open position.

Time delay circuits for tubes 1, 2, 3 and 4

For each of tubes 1, 2, 3 and 4, we have a time delay network for the bias circuits thereof which includes lead 271 (bias supply lead for tube resistor 272), lead 273 to grid of tube 1. Before normally closed point 259 opens, there is a circuit through resistor 272, lead 273, which also charges condenser 291 which, until the bias is removed, supplies a voltage to grid 1. However, when switch point 259 is opened, condenser 291 is discharged through adjustable potentiometer 292 (which may be variably set by the operator) and current limiting resistor 293 to ground 222 as shown. The other side of the bias circuit and tube cathode is grounded as described supra. Thus, the setting of the adjustment on potentiometer 292 determines the time for discharge of condenser 291 which, when it reaches critical grid voltage of tube 1, allows the tube to fire. Resistor 293 limits the current to a very low current offsetting the potentiometer 292. Resistor 272 has two purposes, one to prevent main bias supply from being shorted in case condenser 291 fails. Also it provides a buffer action to prevent burning of point 259, due to sudden inrush of current to condenser 291. It will be understood that we have provided similar potentiometer time control discharge networks for each of the other tubes 2, 3 and 4 and in the drawings we have used the same numerals as for tube 1.

Reapplying bias to tube 3

The bias control of the tube 3 (and also 1 and 2) is interlocked with the microswitch 294 which switch, in turn, is actuated by the rack on the machine, which rack is operated by the hydraulic system including the motor and its piston 63a for the die operating mechanism. The microswitch also has point 170 (normally closed). Closing of point 294 by said rack or machine operated part closes relay 295. This is accomplished by circuits connected with the 24 volt control inlet power relay 181 which includes lead 296 from contact 205 of relay 181, and leads 180 and 297. Another lead 298 also connects from lead 297 to a point 299 (normally open) of relay 239. On the other side of coil 295, a lead 300 connects with normally open side of microswitch 294, referred to supra, and lead 301, leads 302, 303 and 304, normally open point 305 of relay 181.

When coil 295 is energized, coil of relay 258 is also energized. Relay 295 has three normally open points 306, 307 and 308. The connection from relay 295 to relay 258 includes point 306, lead 309, relay coil 258. From the other side of relay 258, lead 310 connects to lead 311, point 312 of relay 172, the other side of the switch 312 has a lead 313 extending to terminal 314 (normally closed), hence, by lead 315 to safety point 316 of a switch associated with normally open button starter switch 169 and said switchpoint 316 also connects to lead 317 and connection 318, lead 319, which connects to lead 297 completing the circuit for energizing coil 295 and, hence, coil 258. Energizing coil 258 opens all three points 259, 260 and 261, which removes bias from tube 1 and allows the bias to be removed in sequence from tubes 2 and 3, and the bias to tube 3 is reapplied by point 261 of relay 258 when relay 258 is deenergized as the machine opens by breaking the microswitch at point 294. In the meantime, bias on tubes 1 and 2 has been restored when tube 3 fires, as stated supra.

*Pressure switch control for preventing machine from opening when metal is being injected into dies*

We provide a special safety control in connection with preventing metal injection when the dies are open and also an improper action in case the operator accidentally presses a control part.

Thus, from relay 175 (to which current is supplied from transformer 168) we provide a circuit from point 179 of relay 175 to a pressure switch 320 by leads 180, 296, 321, 302, 303, point 307 of relay 295, lead 322, to pressure switch 320. This pressure switch 320 is located across the die open and closing control circuit in such a way as to prevent the machine opening, but cannot accidentally close it. When the machine is in automatic control position, relay 181 is energized thereby closing points 205 and points 305, as stated supra, and 24 volts is supplied through point 205, lead 296, 180 to normally open point 179 on relay 175 and in the automatic position, this point 179 is closed, allowing current then present at point 179 to pass through lead 178 to coil of relay 6, hence from the power line to coil 9. The other side of relay 6 by lead 177 connects with a normally open point 176 of relay 175 (closed in automatic position), hence by a lead 173 and a center lead to the pressure switch as shown and lead 322 to point 307 of relay 295. From relay 295 the other side of 307 connects by lead 303 to return control voltage lead 304, point 305 of relay 181 supplying energy at 24 volts from transformer 168.

Point 307 on relay 295 is primarily for connecting pressure switch 320, which is an electrical contact on a pneumatically operated mechanical pressure switch in such a manner that the pressure switch, while it may hold the machine closed as long as air pressure exists on switch 320, yet, if air pressure is supplied accidentally, such action will not result in the closing of machine from an open position since relay 295 must be energized to hold point 307 closed before the pressure switch can be effective to supply energy to the coil 6 (die closing). If switch point 307 is open, such connection will be broken. The microswitch point 294 controls relay 295, and the machine must be closed before 295 is energized. Hence, if the machine is not closed, 295 is deenergized and point 307 is open so that no energy can be supplied to coil 6.

Hence, we have provided not only a dual safety control which will render inoperative the metal injecting means if not in the correct position of one or the other of its two-position locations, since not only must the microswitch be in correct position but the pressure switch 320 is connected in series and, therefore, simultaneously controls the action of the machine to prevent opening of the dies if the metal injection controlling means is in abnormal condition.

*Circuit to prevent relays 7 and 8 from contacting until dies are closed*

When microswitch 294 is closed, this energizes relay 295 and, hence, closes points 306, 307 and 308, as indicated supra. When point 308 closes, we have a safety circuit from point 308 which is connected on one side to lead 303 to 24 volt control circuit. From relay 295 at the other side of point 308, we provide a lead 323 which connects to relay coils 7 and 8 in series. Referring to coil 8, we have a lead 289 connected to point 288 of relay 227, through said point 288, leads 180 and 296 to the other side of the 24 volt circuit at point 205 of relay 181.

This safety circuit, just described, also controls relay 7. Thus, from lead 323 (for relay 8) we also have a lead 324 to relay 7 and from relay 7 by lead 287 we connect to point 286 of relay 220 through point to lead 296, hence to point 205 of relay 181.

Thus, it will be seen that both relays 7 and 8 are interconnected in the system so that these relays cannot be closed when the dies are opening, since relay 295 would be open, and hence point 308 would be open and break the circuits for both relays 7 and 8. Thus, if tubes 1 or 2 fired, due to a fault, their relays 7 and 8 would not operate to inject metal into the dies if open and hence into the room.

*Microswitch must be in correct position*

We have a further circuit to correct a condition, when in operation microswitch 170 becomes jammed in the other position 294 requiring an injection of metal into the die. This additional circuit acts as a safety circuit to prevent such an improper injection of metal in case operator presses close button 169. When operator presses close button point 169 of the switching connections indicated at 13 to start an automatic cycle of the machine, the circuits include safety switch 316, starting switch 169, lead 325 to the microswitch, lead 171 to coil 172, which completes the closing circuit for coil 172, this closes the machine. However, it will be seen that if point 170 is in metal injecting position, the operator will not be able to close the machine, since point 170 would be open if the microswitch is not in its normal position for the start of the cycle.

*Safety circuit to prevent machine operation by accidental closing of microswitch*

We also have a normally closed point 170 of the microswitch connected in such a manner as to prevent operator from closing the machine if the microswitch is jammed. If point 294 of microswitch is closed accidentally, unless at correct normal position, relay 172 has not been energized, leaving point 312 normally open. Relay 258 and associated points 259 and 260 are actually the controlling points for the two stage metal injection through coils 7 and 8. Thus, if microswitch is accidentally closed, causing relay 295 to close, starting shot cycle, relay coil 258 will not be energized even if point 306 of relay 295 has closed, because the other side of coil 258 has its circuit broken, by normally open point 312 which will not be closed unless machine is in normally operating cycle by action of the automatic close button 169. The manually controlled automatic station and the microswitch control circuits are therefore dependent upon each other as indicated.

*Emergency switch for stopping automatic action and causing machine to open and mechanism to be reset*

In the automatic operation of one complete cycle of the machine, the relay 172 acts as an electric self "locking in" means for effecting the supply of current to the various circuits heretofore described. As will be seen from Figure I and the foregoing description, this current supply, as stated supra, is a 24 volt circuit which includes lead 317 on one side and 303 on the other (traced in detail below). We also provide, however, an emergency switch 316 which is normally closed, but which may be opened to break this locking in circuit. Referring to the drawings, this is accomplished as follows:

The 24 volt circuit referred to flows from lead 317 through the normally closed, momentary breaking safety button 316, through lead 315, point 314, lead 313, to relay 172. This relay 172 is energized when the machine is operating in which case point 312 of this relay 172 will be closed. Thus, current from leads 317—313 passes through point 312, lead 311, to point 290 of relay 239, through this point, through leads 326 and 171, to the coil of 172, back to lead 303, which is the other side of the 24 volt supply. Since the locking in 24 volt circuit for relay 172 is supplied between the leads 303 and 317, and this emergency safety button type of switch 316 is interposed between these two leads, it will be seen that when the operator opens the switch 316, the locking relay 172 is released and the shot cycle resets and the dies of the machine open.

Pilot light for heat control instrument

We also have a heat control pilot light 327 in a circuit from the 24 volt transformer 168 connected on one side through leads 197, 328, 208, 329, light 327. From the other side of light 327, we have a lead 330 to leads 331, 201 and lead 202 to the other side of transformer 168. Moreover, we provide an interconnected network so that when the heat control on and off switch 161 is closed (which is a toggle switch) it energizes relay 157 through leads 160 and 162 applying 440 volts to transformer 165 (primary) to supply 110 (secondary) for the heat control motor and gas valve (not shown). This energizes transformer 168 from the 220 secondary of transformer 165, which supplies 24 volts to the pilot light 327 through the circuit just described supra. Therefore, when switch 161 is closed, it applies 24 volts to the pilot lamp 327 showing the operator that the heat control and gas valve section of the cabinet is on. Relay 157 has a transformer 158, the control circuit of which is 24 volts supplied by said transformer from the 440 volt circuit. This avoids the necessity of supplying 440 volts at any time to the control section of the cabinet.

Pilot lamp for indicating machine ready for automatic action

We also provide a lamp 332 connected by lead 321 to lead 296, hence to point 205 of relay 181. On the other side, lamp 332 is connected by lead 302 to lead 304 to point 305 of relay 181. Operator closes switch 200, thereby energizing relay 175, throwing the circuits into automatic position. This energizes bias transformer 184 and connected circuit which, at the end of its time delay (allowing tubes 1, 2, 3 and 4 to warm up) closes point 207 of relay 206 energizing relay 181. This applies the 24 volt control circuit across pilot lamp 332 and also supplies 24 volts to the automatic control section and, hence, shows the operator that the tubes 1, 2, 3 and 4 have been heated sufficiently for operator to close button 169 to start machine in automatic operation, but there is no control voltage on the automatic section until this above-mentioned time delay has expired.

Manual control circuit

We have a manual automatic switch 200 that is for shifting from manual to automatic or automatic to manual, the latter operable when relay 175 is not energized. The control by switch 200 is also dependent on switch 333. Thus, if manual switch 333 is closed, 24 volt control voltage from transformer 168 will flow through lead 202, lead point 334 of relay 181, lead 335 to the manual open and close switch 333, lead 336, point 337 (closed) through the lead 177 to the coil of relay 6 for the die operating mechanism. The return circuit is through lead 178, point 338 (closed), lead 339, to point 204 (relay 181), lead 203, lead 197, to other side of control transformer 168. Thus, when the mechanism is in manual position, determined by the position of switch 200, and switch 333 is closed, 24 volts is applied across the coil of relay 6, operating pilot valve 9 to close and open dies of machine, but the rest of machine, including metal injection, will not operate.

Résumé of circuits—Figure I

From the foregoing, it will be seen that we provide the following main circuits and controls:

(1) POWER INPUT CIRCUIT

Through leads 20, 21 and 22, we supply three phase alternating current, 440 volt current, to the power panel of our combination power panel and electrical control mechanism.

(2) TRANSFORMER AND VARIOUS TRANSFORMER CIRCUITS

We provide a preliminary transformer 158 for the heat control relay 157 referred to supra and connecting circuits therefore; the main transformer 165 for providing circuits for 220 volt and 110 volt; 24 volt control circuit transformer 168; and the bias circuit transformer 184 all with interrelated circuits, as herein appears.

(3) MACHINE OPERATING CIRCUITS

From the foregoing, it will also be seen that we provide a 440 volt circuit for the main machine operating electrical means including the motor 19 for producing oil pressure to operate the die closing mechanism, the coil 9 for operating the electric control for die closing, and the coils 10 and 11 for the two stage metal injection operating means.

(4) CONTROL CIRCUITS

We provide several interrelated and interconnected control circuits to properly effect the application of the foregoing machine operating circuits just referred to. These control circuits are supplied with current at 24 volts and primarily are for operating the coils 6, 7 and 8 to, in turn, effect an operation of the die closing mechanism and the two stage metal injection referred to. These control circuits are basically controlled by the thyratron tubes 1 and 2, tube 3 being for temporarily resetting bias on tubes 1 and 2 and tube 4 for effecting opening of the dies and resetting entire bias to initial position. We also provide a control for effecting an operation of the circuit to the oil pressure motor 19 through contactor 23 through push button stage 340. Each of these circuits includes the various relays as hereinbefore set forth, a complete operation following this list of circuits. The supply of control voltage to coil 6 is primarily through relay 172 when the automatic system has been put into operation by switches 491 and 665 referred to supra and through the close button manually operated single cycle starting switch 169. For energizing coil 10 (from the power line) by means of control coil 7, we provide relay 220 connected in the plate circuit of tube 1 for effecting this result, all as hereinafter more fully described. For operating coil 11 through control coil 8, relay 227 in the plate circuit of tube 2 produces this action.

(5) SAFETY CIRCUITS

We provide two solely safety circuits in the switch point 170 of the microswitch, if the latter is not in the correct position, as indicated supra, under the sub-title, "Microswitch Must Be In Correct Position." We also provide another solely safety circuit in the connection through the switch point 308 of relay 295 to prevent the operation of the metal injection in case the dies are not closed, as described supra, under the sub-title, "Circuit To Prevent Relays 7 and 8 From Contacting Until Dies Are Closed."

(6) PILOT LAMP CIRCUITS

From the foregoing description, it is also clear that we provide pilot lamp indicators to advise the operator of the machine the various conditions as referred to in describing said pilot lamps.

Operation—one complete cycle

As heretofore indicated, the machine is started by the operator closing the quick return close button 169, in the 24 volt control circuit which is connected to the 24 volt control power line and through leads and switches to "locking in" relay 172, hence, relay 175 and correlated circuits and controls from the relay 181 which is connected with the 24 volt transformer 168 to supply current thereto, through the various circuits, heretofore described and clearly shown in Figure I. Closing switch button 169 causes the coil 6 to close the power circuit through the operating coil 9. This action will close the dies of the machine the action being indicated in Figure VI.

As the dies are closed, the microswitch is operated by a part of the die closing mechanism to thereby throw the microswitch to closed 294 position and effect an energization of relay 295. The machine is held closed by a mechanical action of a toggle mechanism. Relay 295 closes switch point 306 and relay 258 is energized, opening point 259 which is in the bias circuit for tube 1, as described supra. Opening the tube 1 bias permits tube 1 to fire at the end of its time delay through its plate circuit, thereby energizing relay 220, closing switch point 286, as stated supra. This, through the various circuits, above described, energizes relay 7 which, in turn, supplies power to the solenoid 10 for controlling the main air valve and permitting a delayed shot of metal at reduced pressure to be injected into the dies as the first part of the two stage metal injection. Specifically, closing of switch point 286 by the discharge of tube 1 connects lead 296 to point 205 of relay 181, point 205 being normally closed, hence, to lead 197 of the 24 volt transformer 168 which supplies current back to switch point 286 of relay 220 which in turn connects the current to lead 287, and as clearly shown in the drawing, to relay 7. The other side of this relay circuit includes leads 324, 323, to point 308 of relay 295 (now closed), through 308, lead 303, 304 to switch 305, lead 202 to transformer 168.

The firing of tube 1 energizes coil 10 and causes the action in which the dies, having previously been closed, solenoid air valve 10 permits movement of the piston 341 and the correlated parts, permits a slow injection of metal by a slow movement of piston 342 at a relatively low pressure and all air beneath the piston 342 is removed by the adjustment of valve 343, as described supra. This is an important feature of our invention since we have found that by removing all the air beneath the piston 342, when the next cycle of operations takes place, it permits a very strong satisfactory injection of main metal into the dies avoiding complicated arrangements heretofore regarded as necessary.

*Temporary auxiliary circuit for biasing tubes 2 and 3*

It will be noted from the wiring diagram of Figure I that we also provide, in addition to the main biasing circuit above described, an auxiliary bias circuit for tubes 2 and 3. To this end it will be noted that we provide a lead 269 from main bias supply lead 254, lead 269 connected through normally closed point 270 of relay 220 and lead 285 to the bias circuit 274, etc., for tube 2. This auxiliary circuit for tube 3 we provide in an additional lead 267 extending from point 266 of relay 232, hence, by lead 281 to lead 277 which connects to the bias circuit of tube 3. This auxiliary biasing circuit for tubes 2 and 3 is on temporarily simultaneously with the main bias supply described above.

*Firing of tube 2*

It will be noted as indicated above, when relay 258 has been energized, the main supply bias at switch points 260 and 261 have also been broken at the same time when the bias supply was broken to tube 1. However, the auxiliary bias supply circuits for tubes 2 and 3 still prevents tubes 2 and 3 from firing.

By the firing of tube 1, just described, this auxiliary bias for tube 2 is also opened because switch point 270 which is in the bias circuit for tube 2, has now been opened by relay 220. Removing tube 2 bias causes the discharge of its circuit at the end of its time delay and energizes relay 227. Thus, when point 288 is closed, current is supplied from the transformer 168 to relay 8 circuits and switches, since we have provided a lead from the lead 296, numbered 180, to switch point 288 (lead 296 being connected to transformer 168 as just described), and from switch 288, lead 289 to relay 8. On the other side of relay 8, we have a lead which joins lead 323 described for relay 7. Hence, the connections are established back to the transformer 168, as just described, in connection with tube 1. As will be understood from the foregoing, the energization of relay 8 in turn connects the 440 volt power line to the coil 11 of the air pilot which causes the main injection of metal at high pressure into the closed die.

It will be noted that by a proper adjustment of the potentiometers 292, particularly for tube 2, we have provided controlling means or an interconnected mechanism so that the time at which the low pressure injection of metal is changed to a high pressure injection may be varied throughout the entire range of movement of the air plunger which actuates the metal injecting piston. However, since the time delay in the firing of tube 2 after both bias circuits have been removed depends on setting of the variable potentiometer 292 for tube 2, by adjustment thereof to its low position, tube 2 may fire substantially immediately after tube 1 fires so that in the overall operation of the network sequential firing system disclosed, tubes 1 and 2 in such case fire without any appreciable difference in time but act as one tube.

*Holding the pressure of the metal in the dies, known as set time*

An important feature in our invention is the correlation of the electric controls herein described, which, at this point in the cycle of operations, permits the apparatus to remain in the position it is in when the piston 342 has reached the bottom of its stroke carrying with it the metal injection piston. The apparatus is now held in this position with the pressure on for a desired length of time, called set time. The time delay in the bias circuit through the potentiometer 292 of tube 3 prevents its discharging until the metal has set in the die as described supra.

*After set time, firing of tube 3*

Next in the cycle of operations, we provide means through the firing of tube 3 to reset the bias circuits for tubes 1 and 2. This is done by establishing a temporary additional biasing circuit hereinafter described. The resetting of the bias of tubes 1 and 2 is done primarily by first removing the above described auxiliary bias from tube 3 by opening the switch point 280 of relay 227 which, as stated supra, occurs when tube 2 fires. Removing the bias from tube 3 therefore causes a discharge after the time delay shown, as will be understood, through its plate circuit. Firing of tube 3 energizes relay 232 which is in the plate circuit of tube 3, as shown, so that energization thereof closes switch points 262 and 264, which are in an additional temporary bias circuit which, as shown in the drawings, includes main supply line 254 which is connected through the now closed switch points 262 and 264, point 262 connected to the bias of tube 1 through 263 and 271 while the temporary additional bias for tube 2 is connected through point 264, lead 265, lead 274 connecting to the bias of tube 2. By closing these switch points 262 and 264, through these additional circuits, just described, tubes 1 and 2 are rebiased. It is understood that when the proper bias is applied to tubes 1 and 2, discharge thereof through the plate circuit ceases.

*Prevention of rebiasing of tube 3*

To prevent rebiasing of tube 3, we have also provided another switch point 266 for relay 232 so that when relay 232 is energized, as just stated, this switch point 266 opens with the result that reestablishing bias through the additional circuits just described to tubes 1 and 2 will not also reestablish, through the auxiliary circuits, bias to tube 3.

From the foregoing, it will be understood that when bias is reestablished to tubes 1 and 2, these tubes cease firing and coils 7 and 8 are deenergized, permitting solenoid operated pilot valves 10 and 11 to be returned to normal position. After tube 3 has fired, the apparatus is in the position in which the pressure has been removed from the metal in the dies and a period of time, called the cooling time, is allowed for the metal to cool, which is the time preceding the firing of tube 4 in our electrical circuits, the "cooling" time being controlled by potentiometer 292 of tube 4.

*Firing of tube 4 opens the dies—machine and circuits thereby reset to initial position*

Firing of tube 4 accomplishes the reopening of the dies. Referring back to tube 3, it will be noted that when it fires, it has opened switch point 268 on relay 232 which, in turn, removes the bias from tube 4 after its time delay through its potentiometer circuit 292, tube 4. When the bias on tube 4 is removed, then the tube discharges, energizing coil 239, opening point 290 on relay 239, thereby breaking the holding circuit for relay 172 which drops out relay 172. Since, as described above, it is the energization of "locking in" relay 172 which closes the dies, the opening of the circuit thereof permits the apparatus to complete the cycle and return to original position. Mechanical means, such as spring X, returns valve 344 to initial position.

*Automatic rebiasing of each of the tubes after mechanically completing one cycle of the machine operation*

When relay 172 is deenergized, as stated supra, effected by the firing of tube 4, then relays 295 and 258 are also both deenergized. This closes the switch points 259, 260 and 261 so that now the main bias is resupplied to both tubes 3 and 4 as well as to tubes 1 and 2. This is due to the fact that the bias supply line 254, as indicated supra, is connected with points 259, 260 and 261 controlled by relay 258 and under normal inoperative position of the machine the closing of these points closes the bias circuit through lead 271 to tube 1, the lead 274 for the bias circuit to tube 2, the lead 277 for the bias circuit to tube 3. It will be also noted that the main bias supply lead line 254 is connected with relay point 268 of relay 232 and since this point is now closed, lead 282 supplies the bias tube 4. Point 268 is closed because of the fact that tube 3 has now been rebiased and therefore relay 232 has been deenergized and spring means closes the contact 268. Rebiasing tube 3 in this manner thereupon permits its relay coil 232 to operate, breaking points 264 and 262, thereby disconnecting the additional bias circuit which was temporarily established for tubes 1 and 2. The entire electrical apparatus is now in initial position. The machine then will not recycle until the operator restarts the cycle by pressing manual close button 169, as described supra.

In referring to the bias supply circuits for the several tubes, we have referred herein to the main bias, an auxiliary bias and an additional bias. However, it is to be understood that the various circuits—some leads of which are common to the different circuits—for supplying bias at the proper time to the different tubes, according to the drawings and description, may be properly termed "additional" or "supplemental" with respect one to another of the bias circuits.

*Interconnection control for supply of bias and plate circuits of tubes for warm up time and to open plate circuits upon failure of bias supply*

It will be noted that we have an important interconnection in the circuit arrangements so that before the machine can be operated, there is a warm up time for the several thyratron tubes and also an interconnection so that if the bias should fail, due to abnormal conditions, such failure opens the main plate circuits of the several tubes so that they would not discharge, as otherwise this would cause an improper operation of the die casting machine. Circuit 244 is for the heaters of the thyratron tubes.

The transformer 184 provides a 5 volt circuit 245 for the filament of the rectifier tube 185. Also the bias circuit for the several thyratron tubes 1, 2, 3 and 4 is supplied from transformer 184 (changed to D. C. by rectifier tube 185), the bias circuit including center tap winding 248, lead 345, voltage reducing resistor 257, branch circuit, lead 249, filter condenser 250, which is grounded as shown. The outside of said winding 248 is connected to the plates of rectifier tube 185, the filaments thereof also grounded as shown. (The cathode circuits for each of the thyratron tubes are likewise grounded.) Resistor 257 also has a connection through main lead 256 to the coil 206 which, being in the bias circuit, as stated above in the description, and shown in the drawings, is also arranged to act as a combined choke and relay, the point 207 being of the type which is slow making and quick breaking. Connected to the coil 206 by lead 252, which connects by lead 253 to the main bias supply line 254 for the main thyratron tubes, we also provide a further regulating means in the regulating tube 251 which is grounded as shown. Moreover, across the tube 251, a resistor 255 is further employed to control the circuits, resistor 255 being grounded as shown.

The switch 207 of coil 206 is as shown in the control circuit which controls the supply circuit for the plate voltage of the several thyratron tubes, so that upon energizing relay 206, the slow closing of the plate circuit through switch point 207 gives the tubes a chance to warm up in their internal circuits before the plate voltage supply is connected to said tubes. Moreover, as stated supra, if there is any failure in any of the bias supply circuits for the tubes, since the same passes through relay coil 206, and this must be energized to close switch 207 in the plate controlling circuits of the tubes, failure of the bias circuit opens the relay point 207 and, hence, disconnects the plate supply circuits to tubes 1, 2, 3 and 4.

*Manual control for operating opening and closing of dies and circuits*

In order to permit the operator to open and close the dies at will without the rest of the machine operating, as may be necessary, we provide an independent circuit manually controlled, which operates merely the coil 6 for operating the die closing mechanism.

Thus, we provide a manually controlled switch 333, which is a circuit extending from the transformer 168 to energize coil 6 independently of the automatic controls described above, said circuit being established to the power input or disconnected therefrom according to the position of the manual-automatic changeover switch 200. For one side of manual switch 333, we provide a lead 336 and a lead 335, which extends to points 334 on relay 181 closed with the manual-automatic changeover switch 200 in the manual position. From switch point 334 of relay 181, lead 202 connects to the 24 volt circuit from the transformer 168. Then, by lead 197, lead 203, switch point 204, lead 339, switch point 338 of relay 175, normally closed under these conditions to lead 178 to coil 6. From the other side of coil 6, lead 177 connects to switch point 337 and from lead 336 to the other side of main manual switch 333, just referred to.

In order to accomplish the foregoing, as indicated, we provide the relay 175 to isolate the rest of the machine so that this manual control may be operated. In order to accomplish this isolation, we provide the relay 175, whose energization is controlled from the manual automatic switch 200 so arranged that when this switch 200 is in the manual position, it deenergizes relay 175, and when in the automatic position, it energizes this relay. Thus, we provide from relay 175, lead 199 to 200', to a switch 200, lead 331, 201 to lead 202, transformer 168, lead 197, lead 198 to relay 175. It will thus be seen, if the manual automatic switch 200 is opened, 175 is deenergized and a control of the dies through the manual switch 333 may be accomplished. However, if the operator closes switch 200, the coil 175 is energized, and this will open the circuit from switch 333 to relay 6. Hence, even if the operator might manipulate the hand switch, no energy would be supplied to coil 6.

It is apparent that, within the scope of the invention, modifications and different arrangements may be made other than is herein disclosed, and the present disclosure is illustrative merely, the invention comprehending all variations thereof.

I claim:

1. An interconnected electrical actuating and controlling system, including power input leads; an electric motor adapted to be supplied with electrical current from said leads; a series of sequentially operating separate solenoids; circuits from said power leads to said motor and to each of said solenoid; a common manually operable switching means in said circuits for simultaneously controlling the circuit from said power line to said motor and to each of said solenoids; said solenoid circuits including a circuit from said common switch to the first of said solenoids; a circuit to the next sequential solenoid connected with said common switch to said power leads; a circuit for a subsequent sequentially operating solenoid adapted to be connected to said power line; a separate controlling relay coil independent of said motor circuits, one for each of said solenoids; a timing network independent of said motor power line circuit for actuating said relay coils; separate switch means controlled by each coil and located in the corresponding solenoid power line circuit, whereby energization and deenergization of said motor, the first-mentioned solenoid and each of said subsequent sequential solenoids are controlled both by the controlling coil of the first-mentioned solenoid circuit and said common switch; connections from a supply for said timing network; a two position switch interposed in the electrical supply connections for said network; and means intercalated between said motor and said two position switch and actuated from said motor for effecting movement of said switch to one position to establish energization of said timing network for controlling the relay for the first of said solenoids and to the other position for energizing said network with the relays for effecting the subsequent operation of the other solenoids.

2. An interconnected electrical actuating and controlling system, including power input leads; an electric motor adapted to be supplied with electrical current from said leads; a plurality of separate solenoid; circuits from said power leads to said motor and said solenoids; a common switching means in said circuits for simultaneously controlling the energization of said motor and said plurality of solenoids; separate controlling circuits; connections from a source of current supply thereto; and a coil independent of said circuits from said power leads to said motor and to said solenoids, one for each of said solenoids; a switch controlled by each coil and located in the corresponding power lead solenoid circuit, whereby energization and deenergization of each of said solenoids is controlled by both a controlling coil and said common switch for simultaneously energizing or deenergizing both of said solenoids and said motor; a two position switch interposed in the electrical supply source for said separate controlling circuits; and means intercalated between said motor and said two position switch and actuated from said motor for effecting movement of said switch to one position to establish energization of said controlling circuits for operating the coil for the first of said solenoids and to the other position for energizing said controlling circuits and the corresponding coils for effecting the subsequent operation of the other solenoids.

3. An interconnected electrical actuating and controlling system, including power input leads; an electric motor adapted to be supplied with electrical current from said leads; a series of three sequentially operating separate solenoids; circuits from said power leads to said motor and to each of said solenoids; a common switching means in said circuits for simultaneously controlling the energization of said motor and said solenoids; said solenoid circuits including a circuit from said common switch to the first of said series of solenoids; a circuit to the second solenoid connected in parallel with said first-mentioned circuit and said common switch and a third circuit to the third solenoid connected in parallel with both said first and second mentioned solenoid circuit; a separate controlling timing network; connections thereto from a current supply; three separate controlling relays independent of said power lead circuits, one relay for each of said solenoid circuits; a switch means controlled by each relay and located in the corresponding solenoid power lead circuit, each of the second and third solenoid circuits being in series with the switch means of said first relay and in parallel with each other whereby energization and deenergization of each of said second and third solenoids is controlled both by said common switch, the first of said controlling relays and the corresponding relay of said second and third solenoids; a two position switch interposed in the electrical supply connections for said networks; and means intercalated between said motor and said two position switch and actuated from said motor for effecting movement of said switch to one position to establish energization of said timing network for controlling the relay for the first of said solenoids and to the other position for energizing said network with the relays for effecting the subsequent operation of the other solenoids.

4. An interconnected electrical actuating and controlling system, including power input leads; an electric motor adapted to be supplied with electrical current from said leads; a series of sequentially operating separate solenoids; circuits from said power leads to both said motor and to each of said solenoids; an electrically operated common switching means in said power-motor solenoid circuits for simultaneously controlling the energization of said motor and said solenoids; a manual switch in said motor-power lead circuit; a tying in relay in said circuit actuated by said manual switch for operating said common switch; said solenoid circuits including a circuit from said common switch to the first of said solenoids; a circuit to a sequential solenoid connected in parallel with said first-mentioned circuit and connected through said common switch; an additional circuit to an additional sequential solenoid connected in parallel with said first-mentioned solenoid; separate controlling coils independent of said power lead-load circuits, one for each of said solenoid circuits; a timing network for said coils; connections thereto from a current source; a separate switch means controlled by each coil and located in the corresponding solenoid circuits whereby energization and deenergization of each of said sequential solenoids subsequent to said first-mentioned solenoid is controlled both by plurality of said controlling coils of said solenoid circuits and said common switch in said motor power lead circuit; a two position switch interposed in the electrical supply connections for said network; and means intercalated between said motor and said two position switch and actuated from said motor for effecting movement of said switch to one position to establish energization of said timing network for controlling the coil for the first of said solenoids and to the other position for energizing said network and the coils for effecting the subsequent operation of the other solenoids.

5. An interconnected electrical actuating and controlling system, including power input leads; an electric motor adapted to be supplied with electrical current from said leads; a series of sequentially operating separate solenoids; circuits from said power leads to said motor and said series of solenoids; a common switching means in said circuits for simultaneously controlling the energization of said motor and said plurality of solenoids; said solenoid circuits including a circuit from said common switch to the first of said series of solenoids; a circuit to the next solenoid in said series connected with said circuit through said common switch to said power leads and a power line circuit between said common switch and a subsequent solenoid connected in parallel with said first-mentioned solenoid circuit; a separate controlling coil independent of said power lead-load circuits, one for each of said solenoids; a timing network for said coils; connections from a current source to said network; a switch means controlled by each coil and located in each of said solenoid circuits, whereby energization and deenergization of said motor, the first-mentioned solenoid and each of said solenoids subsequent to the first of said series are controlled both by the controlling coil of the first-mentioned solenoid circuit and said common switch; a two position switch interposed in the electrical supply connections for said network; and means intercalated between said motor and said two position switch and actuated from said motor for effecting movement of said switch to one position to establish energization of said network for controlling the coil for the first of said solenoids and to the other position for energizing said network and the coils for effecting the subsequent operation of the other solenoids.

6. In an interconnected electrical system adapted to connect a power input supply line with a plurality of loads, said loads including a relatively continuously operating electric motor and a plurality of intermittently operating normally disconnected solenoids acting in sequence and adapted to be supplied with current from the power line; said motor and said solenoids adapted to effect operations of machine parts; manually controlled circuits and switching means between said power line and said motor and said intermittently operating solenoids including a manually controlled switch mechanism having a plurality of switches simultaneously actuated by said switching mechanism; leads from the power line to said switch mechanism; leads from said manually controlled switch mechanism to said motor; leads from said switch mechanism to the first of said solenoids in parallel with said motor power line circuit; a separate branch circuit from said first solenoid circuit to the next operating solenoid; a branch circuit therefrom to the solenoid subsequently operating in said sequence; a timing and controlling network having separate controlling relays for each of said solenoid power circuits, said network including connections from a current source, circuits and controls therefor separate from said power motor and solenoid circuits, said power circuits and the network relay switches for said power solenoid circuits arranged whereby said first solenoid is controlled by both said manual motor switch and the timing network relay for said first solenoid and each subsequently acting solenoid is controlled by said manual switch, by the network relay for the first operating solenoid, and by the corresponding network relay for each subsequently operating solenoid; a two position switch interposed in the electrical supply connections for said network; and means intercalated between said motor and said two position switch and actuated from said motor for effecting movement of said switch to one position to establish energization of said network for controlling the relay for the first of said solenoids and to the other position for energizing said network with the relays for effecting the subsequent operation of the other solenoids.

7. In an interconnected electrical system adapted to connect a power input supply line with a plurality of loads, said loads including an electric motor adapted to be continuously energized under manual control and a plurality of machine part operating solenoids adapted to be automatically energized and deenergized in one cycle, acting in sequence under said manual control, the construction of said motor and said solenoids arranged for separate operation and having power line circuits and switching means between said power line and said loads, said switch mechanism including a singly acting manually operable switch member having a plurality of switch elements; said circuits including leads from said power line to said singly acting switch; leads from said switch mechanism to said motor load and to the first of said solenoids in parallel; a separate branch circuit in parallel with said first solenoid circuit to the next operating solenoid; another branch circuit in parallel with the first solenoid to the solenoid next operating in said sequence; a network having a timing means therein, said network having separate controlling relays, one for each of said solenoid power circuits, connections for said network from a source of current switches in said power solenoid circuits automatically controlled by said relays, said circuits and controls arranged whereby closing said manual switch to the power line simultaneously energizes said motor load and supplies voltage to said solenoid circuits, the energization of said first solenoid being controlled by both said manual motor switch and the timing network relay for said first solenoid and the power line circuits to each of the subsequently acting solenoids being controlled by said manual switch, the timing network relay for the first operating solenoid and the corresponding network relay for each subsequently operating solenoid in a predetermined sequence; a two position switch interposed in the electrical supply connections for said network; means intercalated between said motor and said two position switch and actuated from said motor for effecting movement of said switch to one position to establish energization of said network for controlling the relay for the first of said solenoids and to the other position for energizing said network with the relays for effecting the subsequent operation of the other solenoids; and means whereby deenergization of said timing network relays deenergizes said solenoids without interrupting said power motor circuit.

8. In an interconnected electrical system adapted to connect a power input supply line with a plurality of loads, said loads including an electric motor adapted to be continuously energized and a plurality of machine parts sequentially operating solenoids adapted to be automatically energized and deenergized in one cycle, said motor and said solenoids adapted to be under a single manual control, the construction of said motor and said solenoids arranged for separate operation and having power line circuits and switching means between said power line and said loads, said switch mechanism including a singly acting manually operable switch member having a plurality of switch elements; said circuits including leads from said power line to said singly acting switch; leads from said switch mechanism to said motor load and to the first of said solenoids in parallel; a separate branch circuit in parallel with said first solenoid circuit to the next operating solenoid; another branch circuit in parallel with the first solenoid to the solenoid next operating in said sequence; a time controlled sequentially operating network having separate controlling relays, one for each of said solenoid power circuits, connections between a current source and said network; switches in said power solenoid circuits automatically controlled by said relays, said circuits and controls arranged whereby closing said manual switch to the power line simultaneously energizes said motor load and supplies voltage to said solenoid circuits, the energization of said first solenoid being controlled by both said manual motor switch and the timing network relay for said first solenoid and the power line circuits to each subsequently acting solenoid being controlled by said manual switch, the timing network relay for the first operating solenoid and the corresponding network relay for each solenoid, the interval between operations of said subsequent operating solenoids depending upon the delay effected by said network; said network relays arranged to deenergize simultaneously all solenoids operating subsequently to the first solenoid and thereafter deenergize said first-mentioned solenoid without interrupting said power motor circuit; a two position switch interposed in the electrical supply connections for said network; and means intercalated between said motor and said two position switch and actuated from said motor for effecting movement of said switch to one position to establish energization of said timing network for controlling the relay for the first of said solenoids and to the other position for energizing said network with the relays for effecting the subsequent operation of the other solenoids.

9. An interconnected electrical actuating and controlling system, including power input leads; an electric motor adapted to be supplied with electrical current from said leads; a plurality of separate solenoids; circuits from said power leads to said motor and said solenoids; a common switching means in said circuits for simultaneously controlling the energization of said motor and said plurality of solenoids; separate controlling circuits and a coil independent of said circuits from said power leads to said motor and to said solenoids, one for each of said solenoids; a network; a source of electrical energy connected to supply voltage to said network, said network having time controlling means therein for timing the operation of said separate controlling circuits, said timing network including sequentially operating space discharge tubes; having bias circuits to control discharge thereof; and unitary relay and switch means operated upon discharge of said tubes, one relay for each tube, arrange both to remove the bias to effect discharge of the next tube in sequence and to energize said controlling relays in sequence for effecting operation of said power line load circuits; a switch controlled by each coil and located in the corresponding power lead solenoid circuit, whereby energization and deenergization of each of said solenoids is controlled by both a controlling coil and said common switch for simultaneously energizing or deenergizing both of said solenoids and said motor; a two position switch interposed in the electrical supply connections for said network; and means intercalated between said motor and said two position switch and actuated from said motor for effecting movement of said switch to one position to establish energization of said timing network for controlling the relay for the first of said solenoids and to the other position for energizing said network with the relays for effecting the subsequent operation of the other solenoids.

References Cited in the file of this patent

UNITED STATES PATENTS

| | | |
|---|---|---|
| 1,713,777 | Mortensen | May 21, 1929 |
| 2,060,755 | Exner | Nov. 10, 1936 |
| 2,427,300 | Oliver | Sept. 9, 1947 |